(12) United States Patent
Ling (10) Patent No.: US 10,162,053 B2
(45) Date of Patent: Dec. 25, 2018

(54) MULTIFUNCTIONAL AUTOMOTIVE RADAR

(71) Applicant: Maxlinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 250 days.

(21) Appl. No.: 15/142,935

(22) Filed: Apr. 29, 2016

(65) Prior Publication Data

US 2016/0320482 A1 Nov. 3, 2016

Related U.S. Application Data

(60) Provisional application No. 62/154,840, filed on Apr. 30, 2015.

(51) Int. Cl.
| | |
|---|---|
| *G01S 13/93* | (2006.01) |
| *H04L 5/00* | (2006.01) |
| *G01S 13/42* | (2006.01) |
| *G01S 7/41* | (2006.01) |
| *G01S 13/02* | (2006.01) |
| *G01S 13/87* | (2006.01) |
| *G01S 13/89* | (2006.01) |
| *H01Q 3/24* | (2006.01) |
| *G01S 13/60* | (2006.01) |

(Continued)

(52) U.S. Cl.
CPC ............ *G01S 13/931* (2013.01); *G01S 7/412* (2013.01); *G01S 7/415* (2013.01); *G01S 13/0209* (2013.01); *G01S 13/42* (2013.01); *G01S 13/87* (2013.01); *G01S 13/874* (2013.01); *G01S 13/89* (2013.01); *H04L 5/0007* (2013.01); *G01S 7/006* (2013.01); *G01S 7/4004* (2013.01); *G01S 13/60* (2013.01); *G01S 13/86* (2013.01); *G01S 2013/9375* (2013.01); *G01S 2013/9378* (2013.01); *G01S 2013/9382* (2013.01); *G01S 2013/9385* (2013.01); *G01S 2013/9389* (2013.01); *G01S 2013/9392* (2013.01); *H01Q 1/3233* (2013.01); *H01Q 3/24* (2013.01)

(58) Field of Classification Search
CPC ........ G01S 13/26; G01S 13/28–13/288; G01S 13/60; G01S 13/931
See application file for complete search history.

(56) References Cited

U.S. PATENT DOCUMENTS

| | | | | |
|---|---|---|---|---|
| 6,101,399 | A * | 8/2000 | Raleigh | H01Q 3/2605 342/367 |
| 7,994,969 | B2 * | 8/2011 | Van Caekenberghe | G01S 13/00 342/200 |

(Continued)

*Primary Examiner* — Peter M Bythrow
(74) *Attorney, Agent, or Firm* — McAndrews, Held & Malloy (57) ABSTRACT

In accordance with an example implementation of this disclosure, a multifunction radar transceiver comprises a transmitter and a receiver. The transmitter is operable to modulate data onto a first radar burst, beamform the first radar burst, and transmit the first radar burst via a plurality of antenna elements. The receiver is operable to receive a reflection of the first radar burst, perform beamforming of the reflection of the first radar burst, demodulate the first radar burst to recover the data modulated on the first radar burst, and determine characteristics of an object off of which the first radar burst reflected based on characteristics of the reflection of the first radar burst.

20 Claims, 9 Drawing Sheets

(51) Int. Cl.
*H01Q 1/32* (2006.01)
*G01S 7/00* (2006.01)
*G01S 7/40* (2006.01)
*G01S 13/86* (2006.01)

(56) References Cited

U.S. PATENT DOCUMENTS

| | | | |
|---|---|---|---|
| 2004/0157646 A1* | 8/2004 | Raleigh | H01Q 3/2605 455/562.1 |
| 2005/0116854 A1* | 6/2005 | Beez | G01S 13/58 342/70 |
| 2005/0243748 A1* | 11/2005 | Bosch | H04B 7/2618 370/310 |
| 2007/0274203 A1* | 11/2007 | Kimura | H04L 27/2647 370/208 |
| 2011/0279305 A1* | 11/2011 | Lellouch | G01S 13/58 342/107 |

* cited by examiner

FIG. 7B ary of illustration, the transcrivers.

MULTIFUNCTIONAL AUTOMOTIVE RADAR

PRIORITY CLAIM

This application claims priority to the following application(s), each of which is hereby incorporated herein by reference:
U.S. provisional patent application 62/154,840 titled "Multifunctional Automotive Radar" filed on Apr. 30, 2015.

INCORPORATION BY REFERENCE

The entirety of each of the following applications is hereby incorporated herein by reference:
U.S. provisional patent application 62/155,728 titled "Multistatic Radar via an Array of Multifunctional Automotive Transceivers" filed on May 1, 2015;
U.S. patent application Ser. No. 15/142,926 titled "Multistatic Radar via an Array of Multifunctional Automotive Transceivers" filed on Apr. 29, 2016;
U.S. provisional patent application 62/160,015 titled "Calibration of a Multifunctional Automotive Radar System" filed on May 12, 2015;
U.S. provisional patent application 62/160,316 titled "Scalable Architecture for an Automotive Radar System" filed on May 12, 2015;
U.S. provisional patent application 62/162,206 titled "Dynamic OFDM Symbol Shaping for Radar Applications" filed on May 15, 2015; and
U.S. provisional patent application 62/167,950 titled "Cooperative and Crowd-Sourced Multifunctional Automotive Radar" filed on May 29, 2015.

BACKGROUND

Limitations and disadvantages of conventional automotive radar systems and methods will become apparent to one of skill in the art, through comparison of such approaches with some aspects of the present method and system set forth in the remainder of this disclosure with reference to the drawings.

BRIEF SUMMARY

Methods and systems are provided for multifunctional automotive radar, substantially as illustrated by and/or described in connection with at least one of the figures, as set forth more completely in the claims.

DETAILED DESCRIPTION

Figure 1:
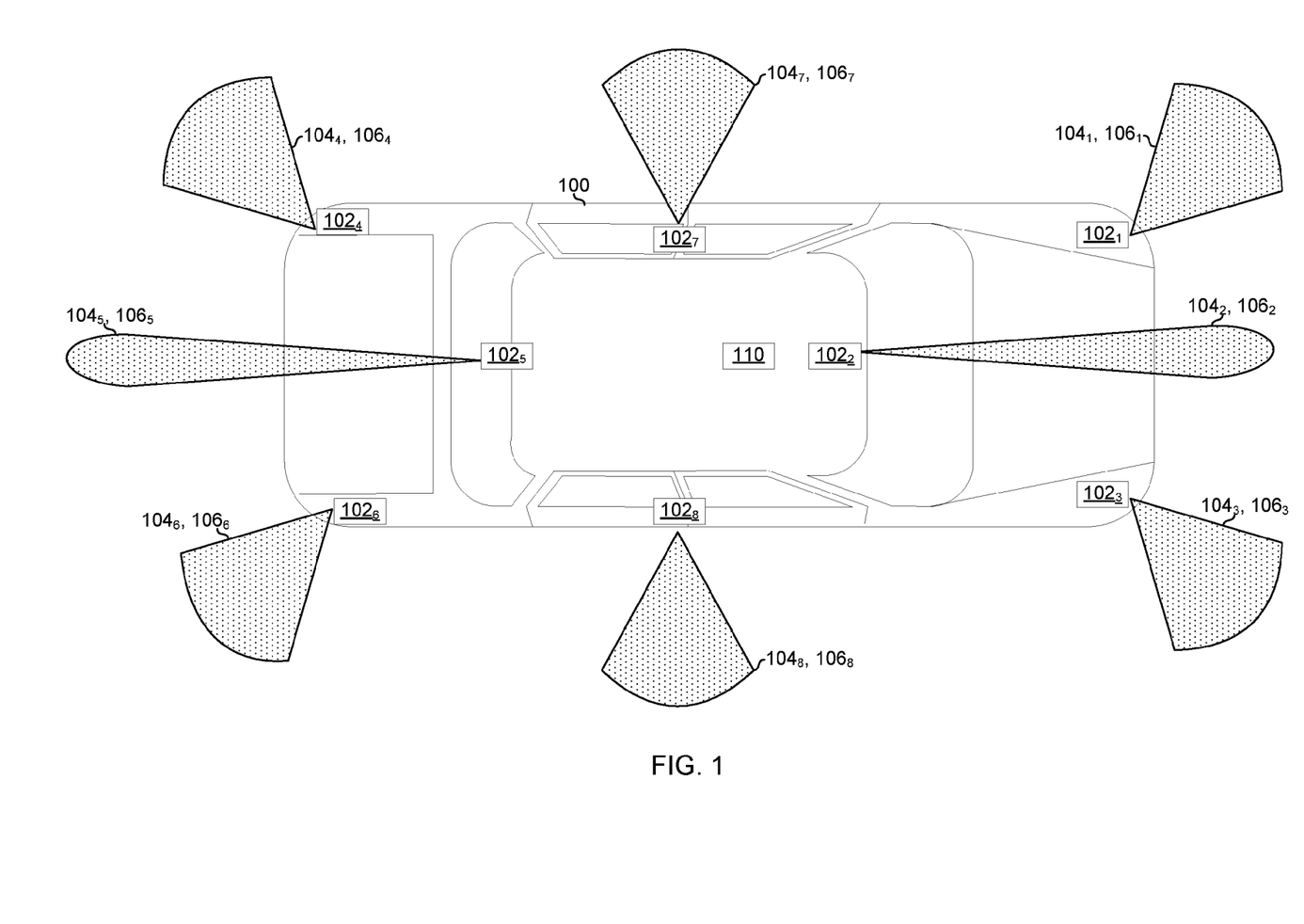
FIG. 1 shows an automobile comprising a plurality of multifunctional radar transceivers.

FIG. 1 shows an automobile comprising a plurality of multifunctional radar transceivers 102 (labeled with subscripts '1' through '8') of an automobile 100. Although the example automobile 100 comprises eight transceivers 102 for illustration, any number may be present. Each multifunctional radar transceiver 102 has a corresponding receive antenna pattern 104 and transmit antenna pattern 106 (for clarity of illustration, the transmit and receive patterns are shown as the same, but they need not be). As discussed in further detail in the remainder of this disclosure, the multifunctional radar transceivers 102 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 100 (the "scene").

The positioning function comprises use of the same millimeter wave signals used for the radar function to improve upon coarse position determined through other mechanisms such as GPS.

The communication function comprises communicating data among the multifunction radar transceivers 102 using of the same millimeter wave signals as are used for the radar function. Such data may include, for example, pixel or voxel data (and time and position metadata) generated using the radar and positioning functions.

Through a combination of the radar function, the positioning function, and the communication function, the multifunctional radar transceivers $102_1$-$102_8$ are operable to generate a scene representation (e.g., 2D pixel grid or 3D voxel grid) where the absolute time of capture of the scene representation and the absolute position of the pixels (2D) or voxels (3D) in the scene representation are known.

The circuitry 110 represents other circuitry of the automobile 100 such as one or more transceivers (e.g., cellular, Wi-Fi, Bluetooth, GPS, etc.), instrumentation (e.g., entertainment system, driver indicators/gauges, driver controls), sensors for safety systems, etc. The circuitry 110 may be communicatively coupled to the transceivers 102 via a CANbus, for example. The circuitry 110 may be operable to process data from the transceivers and take action (e.g., trigger driver alerts, transmit messages via one or more of its transceivers, trigger braking or other safety systems, etc.) in response to such data. The circuitry 110 may also generate data which it may pass to the transceiver(s) 102 for communication to a remote transceiver 102 (e.g., that is mounted to another automobile and/or to infrastructure such the road, sign post, stop-light, etc.) In an example implementation, the circuitry 110 may comprise a cell phone that connects to an electronics system of the automobile 100 via USB, Bluetooth, Wi-Fi, or any other suitable interface and then the electronics system 110 of the automobile 100 leverages the cellular transceiver of the circuitry 110 for connecting to a cellular network.

Figure 2A:
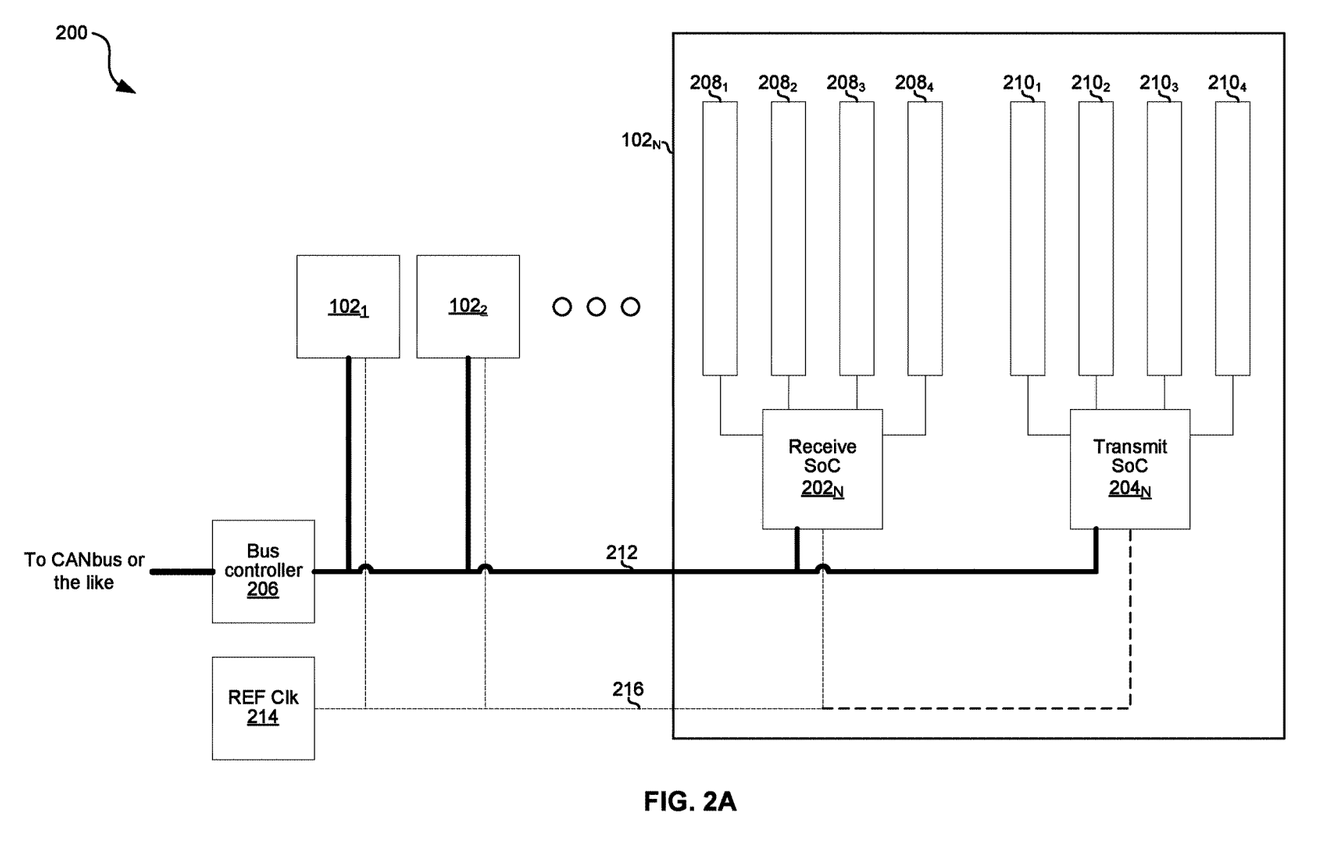
FIG. 2A shows an example architecture of a multifunctional radar system of an automobile.

FIG. 2A shows an example architecture of a multifunctional radar system of an automobile. The example multifunctional radar system 200 comprises N multifunction radar transceivers 102, a bus controller 206, a reference clock generator 214, data bus 212, and clock distribution bus 216. For clarity of illustration, example implementation details are shown for only the $N^{th}$ transceiver ($102_N$), but the other transceivers $102_1$-$102_{N-1}$ may be the same. Each multifunctional radar transceiver $102_n$ (the subscript 'n' used here to generically represent each of the transceivers $102_1$-$102_N$ individually) comprises a receive SoC $202_n$, a transmit SoC $204_n$, a plurality of receive antenna elements 208 (labeled with subscripts 1 through 4, where four was chosen arbitrarily for illustration but any number greater than one may be used), and a plurality of transmit antenna elements 210 (labeled with subscripts 1 through 4, where four was chosen arbitrarily for illustration but any number greater than one may be used, and the number of transmit antenna elements need not match the number of receive antenna elements). In an example implementation, each of the multifunctional radar transceivers 102 comprises one or more CMOS dies on a printed circuit board. In an example implementation, each of the receive SoCs $202_N$, the transmit SoC $204_N$, the bus controller 206, and the reference clock generator 214 is a separately packaged CMOS integrated circuit.

Each of the receive antenna elements $208_1$-$208_4$ comprises, for example, a copper microstrip patch antenna on a printed circuit board (e.g., FR4, Duroid, or the like). Although four elements 208 are shown for illustration, any number may be used.

Each receive SoC $202_n$ is operable to receive millimeter wave signals (e.g., in the 76 to 81 GHz band) via the antenna elements $208_1$-$208_4$. The receive SoC $202_n$ is operable to process received millimeter wave signals for supporting the radar, positioning, and communication functions. The receive SoC $202_n$ is also operable to communicate over data bus 212 and to synchronize its timing to a signal output by reference clock 214 onto clock distribution bus 216. Additional details of an example receive SoC $202_n$ are described below with reference to FIG. 2B.

Each of the transmit antenna elements 210 comprises, for example, a copper microstrip patch antenna on a printed circuit board (e.g., FR4, Duroid, or the like). Although four elements 210 are shown for illustration, any number may be used.

The transmit SoC $204_n$ is operable to transmit millimeter wave signals (e.g., in the 76 to 81 GHz band) via the antenna elements $210_1$-$210_4$. The transmit SoC $204_n$ is operable to generate the signals in such a manner as to support the radar, positioning, and communication functions. The transmit SoC $204_n$ is also operable to communicate over data bus 212 and to synchronize its timing to a signal output by reference clock 214 onto clock distribution bus 216. Additional details of an example transmit SoC $204_n$ are described below with reference to FIG. 2C.

The bus controller 206 is operable to relay data between the data bus 212 interconnecting the multifunction radar transceivers $102_1$-$102_N$ and a data bus of the automobile 100 (e.g., a CAN bus). The bus 212 may, for example, be a high speed serial bus and the bus controller 206, receive SoC $202_n$, and transmit SoC $204_n$ may each be operable to perform serialization and deserialization for communicating over the bus 212.

The reference clock generator 212 comprises a crystal oscillator, phase locked loop, and/or other circuitry for generating a signal to act as a phase reference for receive SoC $202_n$ and transmit SoC $204_n$. In an example implementation, the frequency of the reference signal may be relatively low compared to the millimeter wave frequencies (e.g., on the order of tens or hundreds of MHz), which may greatly relax the routing requirements for the bus 216 as compared to trying to distribute a reference signal in the 77 to 81 GHz range. In another example implementation, the frequency of the reference signal may be the same as the millimeter wave carrier frequency (e.g., it the range 77 to 81 GHz).

Figure 2B:
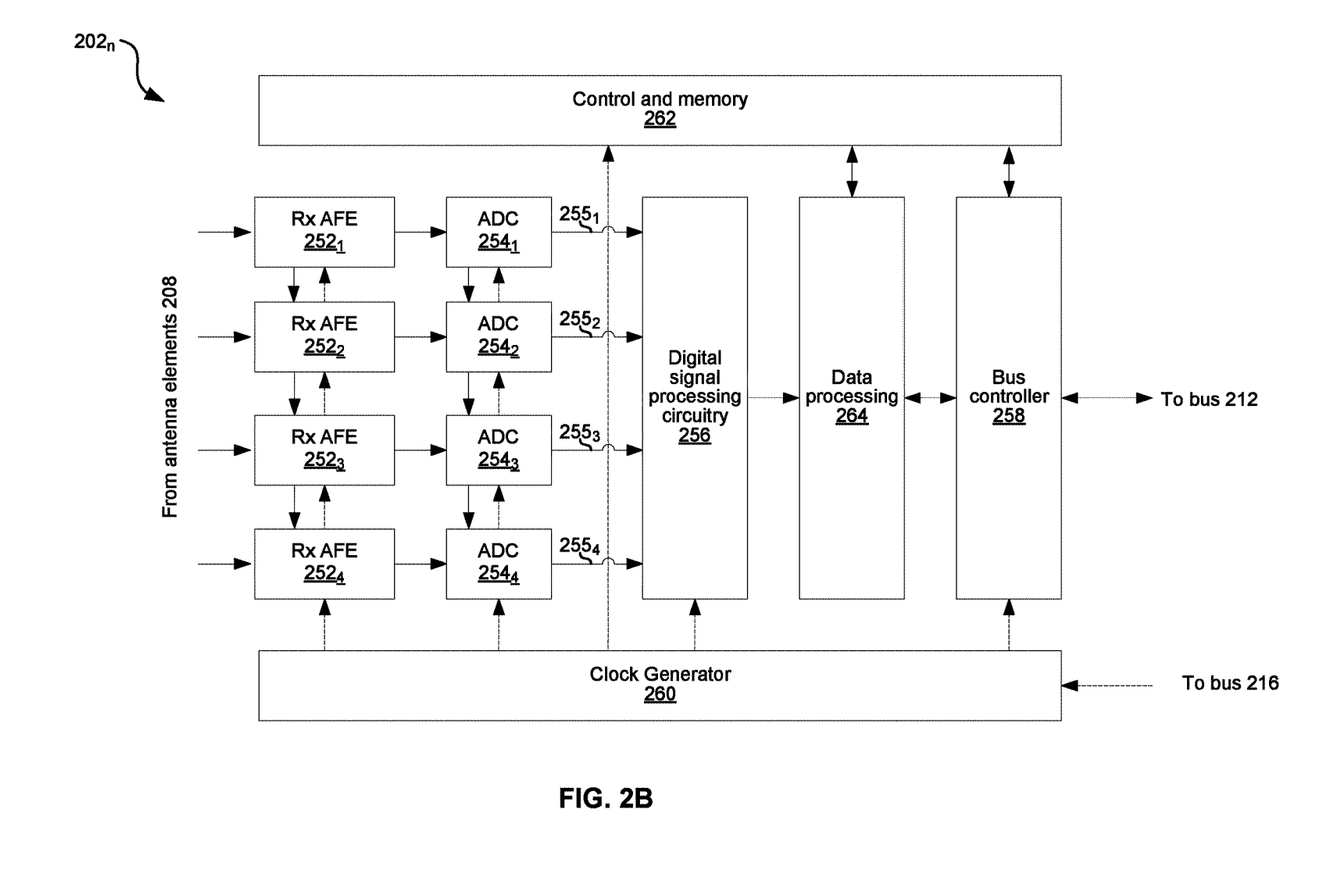
FIG. 2B shows an example implementation of a receiver system on chip (SoC) of a multifunctional radar transceiver of FIG. 2A.

FIG. 2B shows an example implementation of a receiver system on chip (SoC) of the multifunctional radar transceiver of FIG. 2A. The example receive SoC $202_n$ comprises a plurality (a number corresponding to the number of receive antenna elements 208) of receive analog front ends (Rx AFEs) 252, a plurality of analog-to-digital converters (ADCs) 254, digital signal processing circuitry 256, data processing circuitry 264, bus controller circuitry 258, clock generation circuitry 260, and control and memory circuitry 262.

Each of the Rx AFEs 252 is operable to process a millimeter wave signal (e.g., in the band from 76 to 81 GHz) from a respective one of the plurality of antenna elements 208. The processing may comprise, for example, low noise amplification, filtering, and down-conversion so as to output a 1 to 5 GHz wide intermediate frequency or baseband signal.

Each of the ADCs 254 is operable to digitize the output of a corresponding one of the Rx AFEs 252. For example, each Rx AFE 252 may downconvert a received 76 to 77 GHz band to a 1 GHz wide baseband signal which the corresponding ADC 254 may then digitize to generate a 1 GHz wide digital signal. As another example, each Rx AFE 252 may downconvert a received 76 to 81 GHz band to a 5 GHz wide baseband signal which the corresponding ADC 254 may then digitize to generate a 5 GHz wide digital signal 255.

The digital signal processing circuitry 256 is operable to process the digitized signals from the plurality of ADCs 254 to recover information conveyed by the received signals. Such information may be conveyed by characteristics (e.g., latency, Doppler shift, signal strength, etc.) of the received signals, as is the case in a conventional radar system, and/or may be data that was modulated onto the received signals.

The processing performed by the digital signal processing circuit 256 may comprise, for example, channel estimation and equalization.

The processing performed by the digital signal processing circuit 256 may, where the millimeter wave signals are modulated by a data signal, comprise demodulation. For example, the millimeter wave signals transmitted by transceivers 102 may comprise bursts (or "chirps") whose amplitude is modulated relatively slowly as compared to the channel frequency (e.g., a few MHz as compared to a channel frequency of 76-81 GHz), and the digital signal processing circuitry 256 may be operable to track the signal envelope to recover the data signal. As another example, the millimeter wave signals transmitted by transceivers 102 may comprise OFDM symbols and the digital signal processing circuit 256 may be operable to demodulate the received signals using a discrete Fourier transform. The digital signal processing circuit 256 may then be operable to demap the modulated signal according to one or more symbol constellations, deinterleave the demapped bits, and decode the demapped bits. The recovered bits may then be provided to the control and memory subsystem 262 and/or output onto the bus 212.

The processing performed by the digital signal processing circuit 256 may comprise beamforming. The beamforming may comprise time-domain beamforming in which one or more sets of phase and amplitude coefficients is applied to each of the signals 255 in the time domain. Alternatively, or additionally, the beamforming may comprise frequency-domain beamforming in which the signals 255 are first transformed to the frequency domain (e.g., via a DFT) and then each subband (e.g., each OFDM bin or group of OFDM bins) is processed using a corresponding one or more beamforming matrices determined for that subband. In this manner, different subbands may be communicated on beams pointed in different directions.

The processing performed by the digital signal processing circuit 256 may comprise spectral analysis of the received signals. The spectral analysis may comprise, for example, mixing received signals with one or more reference signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected.).

The processing performed by the digital signal processing circuit 256 may comprise separating different transmitted signals (e.g., originating from different ones of the transceivers $102_1$-$102_8$). The may comprise, for example, correlating the received signals with different orthogonal codes and/or pseudorandom sequences used by different ones of the transceivers $102_1$-$102_8$. Alternatively, or additionally, separating different transmitted signals (e.g., to determine which transceiver 102 sent which signal) may comprise directly recovering a respective identifier (e.g., a unique identifier such as a MAC address or similar) modulated onto each of the millimeter wave signals. The ability to distinguish which, if any, energy arrived from each transceivers $102_1$-$102_8$ may be useful for performing the radar function, the positioning function, and the communication function of the transceivers 102. For the radar and positioning functions, for example, the identification of which of transceivers $102_1$-$102_8$ sent any particular received signal may be used for determining the position and angle from which the signal was transmitted (since the different transceivers $102_1$-$102_8$ are at different positions on the automobile 100), which may be used for determining precise distance to, and location of, objects in the scene. For the communication function, for example, the identification of which of transceivers $102_1$-$102_8$ sent any particular received signal may be used in a manner similar to a "from" address in many networking protocols.

The data processing circuitry 264 is operable to process data output by the digital signal processing circuitry 256. Such processing may comprise, for example, implementing algorithms to generate a representation of the scene detected using the radar function. Based on the angle, strength, timing, spectral content, and/or other characteristics of the received signals, the data processing circuitry 264 may generate a 2D pixel grid or 3D voxel grid. In an example implementation, each pixel or voxel may indicate an absolute position to which it corresponds (determined via the positioning function of the multifunction radar system), the strength of returns, if any, received from that location (determined via the radar function of the multifunction radar system), spectral content of returns, if any, received from that location, and/or time(s) at which returns were received from that location and/or at which the pixel or voxel data was updated.

The data processing circuitry 264 may also be operable to process data received from the data bus 212. For example, positioning information may be received via the bus 212 (e.g., GPS coordinates from a GPS receiver of the vehicle 100) and combined with data recovered from the digital processing circuitry 264 for performing the positioning function.

The processing performed by data processing circuitry 264 of data output by digital signal processing circuitry 256 may comprise, for example, preparing data for output onto the data bus 212. For example, a scene representation generated from the output of the digital signal processing circuitry 256 may be transmitted onto the data bus 212.

The bus controller circuitry 258 may be substantially similar to the bus controller 206 described above.

The clock generation circuitry 260 is operable to generate a plurality of timing signals that are synchronized to the timing signal received via bus 216. The timing signals may comprise, for example: a local oscillator signal for direct downconversion of received millimeter wave signals (e.g., in the 76 to 81 GHz range), a sampling clock for the ADCs 254 (e.g., between 2 and 20 GHz), and one or more clocks for clocking the digital processing circuitry 256, the bus controller 258, and the control and memory subsystem 262.

The control portion of subsystem 262 is operable to manage operations of the receiver SoC $202_n$ (e.g., implement a state machine and/or other control logic that controls the configuration of the other components of the receive SoC $202_n$). The control portion of subsystem 262 may, for example, configure beamforming matrices used by the digital signal processing circuitry 256. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications from other transceivers 102 that are likely to come from that direction. Directions of interest may be determined based on, for example, data received via the data bus, data carried in previously received millimeter wave signals, and/or previously generated scene representations.

The memory portion of subsystem 262 is operable to store relatively large amounts (e.g., hundreds of megabits) of information of a variety of forms. For example, beamforming matrices, an identifier of the transceiver 102, scrambling codes, and messages received from (via data bus 212) and/or to be communicated to (via data bus 212 and/or via millimeter wave signals) other transceivers are just some examples of the information which may be stored in the memory and readily accessible to the SOC $202_n$.

Figure 2C:
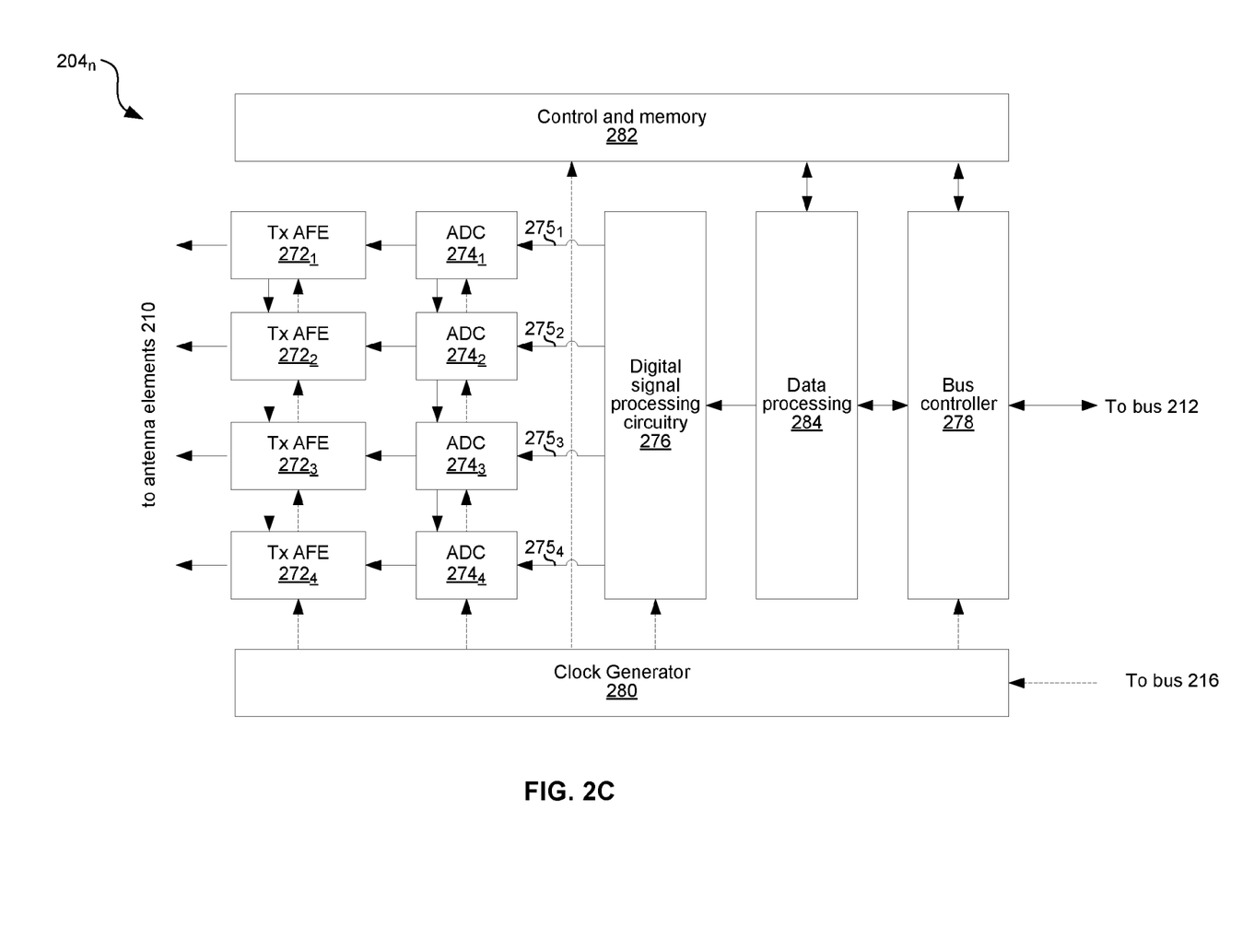
FIG. 2C shows an example implementation of a transmitter system on chip (SoC) of a multifunctional radar transceiver of FIG. 2A.

FIG. 2C shows an example implementation of a transmitter system on chip (SoC) of the multifunctional radar transceiver of FIG. 2A. The example transmit SoC $204_n$ comprises a plurality of transmit analog front ends (Tx AFEs) 272, a plurality of analog-to-digital converters (ADCs) 254, digital signal processing circuitry 276, data processing circuitry 284, bus controller circuitry 278, clock generation circuit 280, and control and memory subsystem 282.

Each of the Tx AFEs 272 is operable to receive an analog baseband signal from a respective one of ADCs 274, upconvert the signal to a millimeter wave (e.g., a 1 GHz to 5 GHz wide signal in the band from 76 to 81 GHz), and amplify the millimeter wave signal for output to a respective one of antenna elements $210_1$-$210_4$.

Each of the ADCs 274 is operable to convert a digital signal 275 from the digital signal processing circuitry 276 to an analog representation. For example, each signal 275 may be a 1 GHz to 5 GHz wide baseband signal.

The digital signal processing circuitry 276 is operable to process one or more data streams from data processing circuitry 284 to generate a plurality (four in the example shown) of digital baseband signals 275. Processing performed by digital signal processing circuitry 276 may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The processing performed by the digital signal processing circuit 276 may comprise generating modulated signals $275_1$-$275_4$ and/or generating a data signal to be modulated onto a carrier. As an example of the former case, the digital signal processing circuit 276 may output a continuous wave signal, or a chirp whose amplitude is modulated by a data signal whose frequency is relatively low (e.g., a few MHz) as compared to the channel frequency (e.g., between 76 GHz and 81 GHz). As another example of the former case, the digital signal processing circuit 276 may output an OFDM signal. As an example of the latter case, the digital signal processing circuit 276 may output a relatively low bandwidth data signal (e.g., a few MHz) which may modulate a millimeter wave chirp generated by the clock generator 280.

The processing performed by the digital signal processing circuit 276 may comprise beamforming. The beamforming may comprise time-domain beamforming and/or frequency-domain beamforming.

Data processing circuit 284 is operable to generate one or more data signals for modulation onto the millimeter wave signals transmitted by the SoC $204_n$. The datastreams may, for example, be read from memory of the SoC $202_n$ (e.g., an identifier of the module $102_n$) and/or generated algorithmically (e.g., timestamps generated based on a clock of the control portion of subsystem 282). Additionally, or alternatively, the data may be received from bus 212 via bus controller 278. The data processing circuit 284 may packetize and/or otherwise format the data.

Bus controller 278 may be substantially similar to the bus controller 206 described above.

Clock generation circuit 280 is operable to generate a plurality of timing signals that are synchronized to the timing signal received via bus 216. The timing signals may comprise, for example: a local oscillator signal for upconversion of baseband signals to millimeter wave signals (e.g., in the 76 to 81 GHz range), a sampling clock for the DACs 274 (e.g., between 2 and 20 GHz), and one or more clocks for clocking the digital processing circuitry 276, the bus controller 278, and the control and memory subsystem 282.

The control portion of subsystem 282 is operable to manage operations of the receiver SoC $204_n$ (e.g., implement a state machine and/or other control logic that controls the configuration of the other components of the receive SoC $204_n$). The control portion of subsystem 282 may, for example, configure beamforming matrices used by the digital signal processing circuitry 276. For example, the control portion of subsystem 282 may determine that particular directions are of interest at a given time and may configure the beamforming to point beams in those particular directions. Particular directions may be of interest because, for example, it may be desirable to determine more information about objects located in that direction and/or to listen for communications from other transceivers 102 that are likely to come from that direction. Directions of interest may be determined based on, for example, data received via the data bus 212, scene scanning algorithms, and/or the like.

The memory portion of subsystem 282 is operable to store relatively large amounts (e.g., hundreds of megabits) of information of a variety of forms. For example, beamforming matrices, and messages received from (via data bus 212 and/or millimeter wave signals) and/or to be communicated to (via data bus 212 and/or modulated onto millimeter wave radar signals) other transceivers are just some examples of the information which may be stored in the memory and readily-accessible to the SoC $204_n$.

Figure 3A:
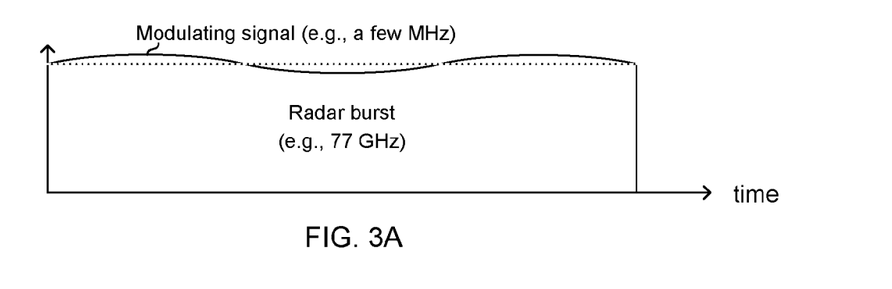
FIGS. 3A and 3B show two example signal formats used by a multifunctional radar transceiver.
Figure 3B:
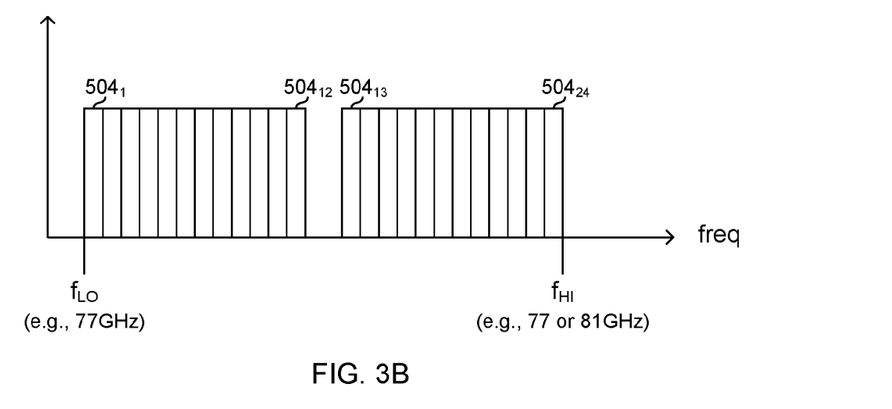

FIGS. 3A and 3B show two example signal formats used by a multifunctional radar transceiver. In FIG. 3A, the millimeter wave signal (e.g., a continuous wave signal or series of frequency ramped "chirps") is amplitude modulated by a relatively slowly varying data signal. In FIG. 3B the millimeter wave signal is an OFDM signal which, for any given burst (frame) may transmit one or more of a plurality of subbands 504 (twenty-four subbands were chosen arbitrarily for illustration, any number may be used). Each of the subbands $504_1$-$504_{24}$ may be a continuous wave or may be modulated by a data signal (e.g., a N-QAM symbol corresponding to $\log_2(N)$ bits of the data signal). Different subbands and/or groups of subbands may be allocated for different purposes (e.g., some for radar, some for positioning, and some for communication). Similarly, using frequency-domain beamforming, different subbands and/or groups of subbands may be pointed in different directions for detecting objects at different locations in the scene and/or for transmitting the data signal in directions (e.g., pointed at different reflection paths leading to different ones of the transceivers $102_1$-$102_8$).

Data modulated onto the millimeter wave signal may be forward error correction encoded for robustness. Data modulated onto the millimeter wave signal may be scrambled or encrypted for security (e.g., to prevent spoofing, sniffing of communications, etc.).

Figure 4:
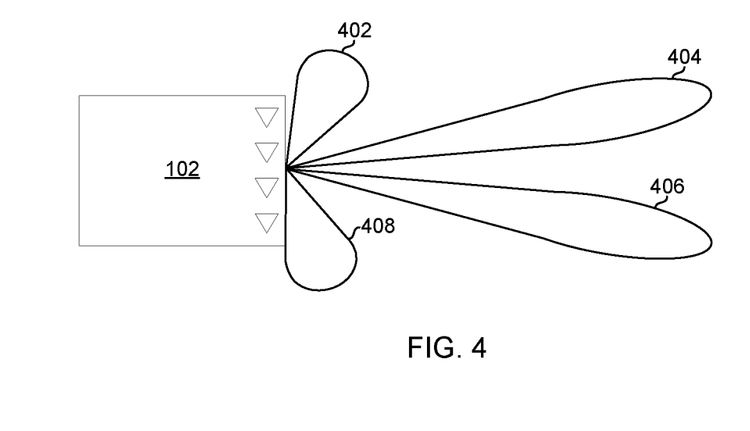
FIG. 4 shows an example antenna pattern of the multifunctional radar transceiver of FIG. 2.

FIG. 4 shows an example antenna pattern of the multifunctional radar transceiver of FIG. 2. For example, for the radar function, lobes 402 and 408 may be used for identifying objects that are relatively close and off to the side of the transceiver $102_n$, and the lobes 404 and 406 may be used for looking further in the distance (e.g., in the direction of travel of the automobile 100 or looking behind the automobile 100). As another example, for the radar function, the lobes 402 and 408 may receive returns from the nearby road surface and the Doppler of such returns may be used for calculating the speed of the automobile 100. As another example, for the communication function, lobes 402 and 408 may be used for directly communicating with another transceiver 102 off to the side of the depicted transceiver $102_n$ and lobes 404 and 406 may be used for communicating with other transceivers by bouncing the signals off of objects in the scene.

Although four beams/lobes are shown for illustration, the multifunctional radar transceivers are not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers with which it is necessary or desirable to communicate at any given time. Similarly, the directions of the beams may vary over time. For example, the directionality of any one or more of the beams 402, 404, 406, and 408 may change periodically, based on what is detected in the scene, based on desired communication to be sent or received, and/or the like.

Figure 5:
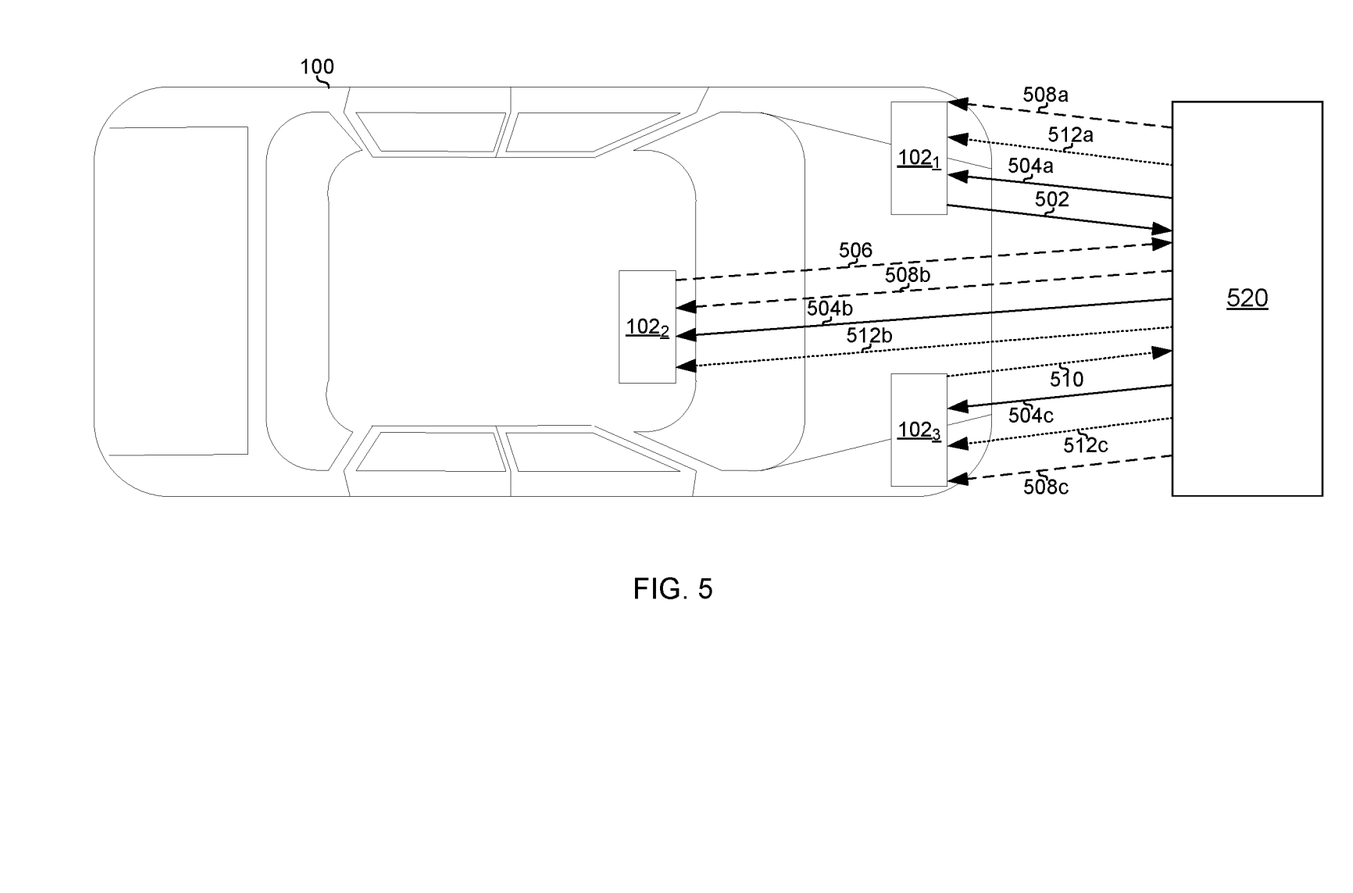
FIG. 5 shows example multifunctional radar signals communicated among a plurality of radar transceivers of an automobile.

FIG. 5 shows example multifunctional radar signals communicated among a plurality of radar transceivers of an automobile. The transceiver $102_1$ transmits millimeter wave signal 502 which reflects off of object 520 (e.g., the car in front of the automobile 100) and is then received as signal 504a by transceiver $102_1$, signal 504b by transceiver $102_2$, and signal 504c by transceiver $102_3$. The transceiver $102_2$ transmits millimeter wave signal 506 which reflects off of object 520 and is then received as signal 508a by transceiver $102_1$, as signal 508b by transceiver $102_2$, and as signal 508c by transceiver $102_3$. The transceiver $102_3$ transmits signal 510 which reflects off of object 520 and is then received as signal 512a by transceiver $102_1$, as signal 512b by transceiver $102_2$, and as signal 512c by transceiver $102_3$.

As discussed above, each of the transceivers $102_1$, $102_2$, and $102_3$ may be operable to separate its respective received signals. That is, transceiver $102_1$ can distinguish between energy of signal 504a, energy of signal 508a, and energy of signal 512a. Similar can be said for each of transceivers $102_2$ and $102_3$. This separation may be possible because, for example, the signals 502, 506, and 510 are frequency division multiplexed, time division multiplexed, spatially multiplexed, and/or code division multiplexed. Coordination for carrying out such multiplexing may be achieved as a result of, for example: factory settings of the three transceivers $102_1$, $102_2$, and $102_3$; passing control/coordination information among the transceivers $102_1$, $102_2$, and $102_3$ via the data bus 212; passing control/coordination information among the transceivers $102_1$, $102_2$, and $102_3$ via the millimeter wave signals 502, 506, 510, and/or the like.

An example process for carrying out the positioning function of the multifunction radar transceivers $102_1$, $102_2$, and $102_3$ using the signals of FIG. 5 is described below with reference to FIG. 6. Example processes for carrying out the communication function using the signals of FIG. 5 are described below with reference to FIGS. 7A-7B.

Figure 6:
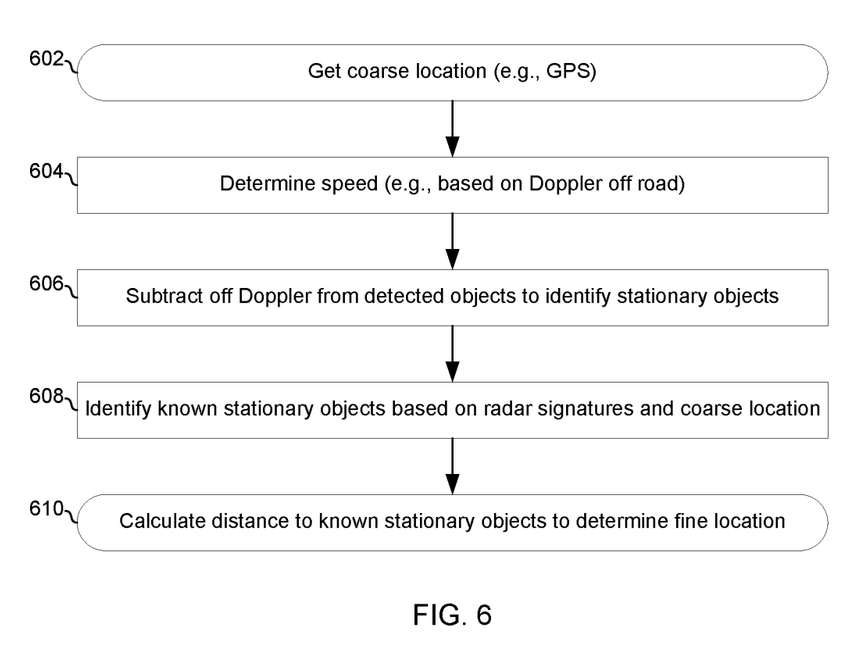
FIG. 6 is a flowchart illustrating an example process for positioning using one or more multifunctional radar transceivers.

FIG. 6 is a flowchart illustrating an example process for positioning using one or more multifunctional radar transceivers. For purposes of illustration, the process will be described as if performed by transceiver $102_1$ of FIG. 5, but the process of FIG. 6 may be carried out by any suitable circuitry. For example, the process may be carried out by the plurality of control and memory circuits 262 of transceivers $102_1$-$102_3$ operating in concert via the data bus 212, by a processor of the automobile 100 in communication with the transceiver(s) 102 via the data bus 212 and bus controller 206, and/or in the "cloud" via a wide area network connection (e.g., LTE) of the automobile 100.

The process begins with block 602 in which coarse location of transceiver $102_1$ is obtained. This coarse location may be, for example, coordinates from a GPS receiver of the automobile 100.

In block 604, the speed of the transceiver $102_1$ is determined. The speed may be determined by, for example, transmitting a millimeter wave signal at the road beneath, or just in front of, the automobile 100 and measuring the Doppler shift of the reflections of that signal. Additionally, or alternatively, the speed may be provided by the on-board electronics 110 of the automobile 100.

In block 606, the Doppler shift caused by the movement of the automobile 100 is subtracted off of the Doppler shift of the signals 504a, 508a, and 512a to determine whether any stationary objects have been detected in the scene. That is, if the Doppler shift of signal 504a (and the same goes for 508a and 512a) is entirely due to the movement of the automobile 100, then the signal 504a reflected off of a stationary object. Since all signals bounce off the same object 520 in the illustrated example, the result will be the same for each, but it is of course possible that they reflect off different objects some of which may be moving and some of which may be stationary.

In block 608, it is determined whether there are any stationary objects in the scene and, if so, whether the location of such object(s) is/are known. For example, the coarse location of the automobile along with one or more characteristics of the object and/or characteristics of the signals 504a, 508a, and/or 512a may be input to a mapping service (which may operate in the cloud and/or be cached locally on the automobile 100) to identify the object 520 and, if identified, its precise location. Such characteristics of the object may comprise, for example: the shape of object 520, the size of object 520, the estimated distance to object 520, and/or the like. Such characteristics of the signals 504a, 508a, and 512a may comprise, for example, their directionality and/or spectral content. For example, given the coarse coordinates of the automobile 100 along with the size, shape, distance to, and directionality to the object 520, the object may be present in the database of the mapping service and may be identified as a billboard and a very precise location of the billboard may be returned to the transceiver $102_1$ by the mapping service. In some instances, only one or two of the signals 504a, 508a, and 512a may be necessary to accurately determine the distance to and/or direction to the object. Use of two or three of the signals, however, may provide more accurate results since one or more of the signals may be obstructed at any given time and, when two or more are available, triangulation algorithms may be used to enhance the accuracy.

In block 610, the angle and distance to the object 520 determined based on the signals 504a, 508a, and 512a is used to translate the precise position of the object 520 to the precise location of the transceiver $102_1$.

In-between identification of objects having known locations, and/or when GPS signal is lost, the position of the automobile 100 may be updated based on speed and direction of travel determined via the radar function of the transceivers 102.

Figure 7A:
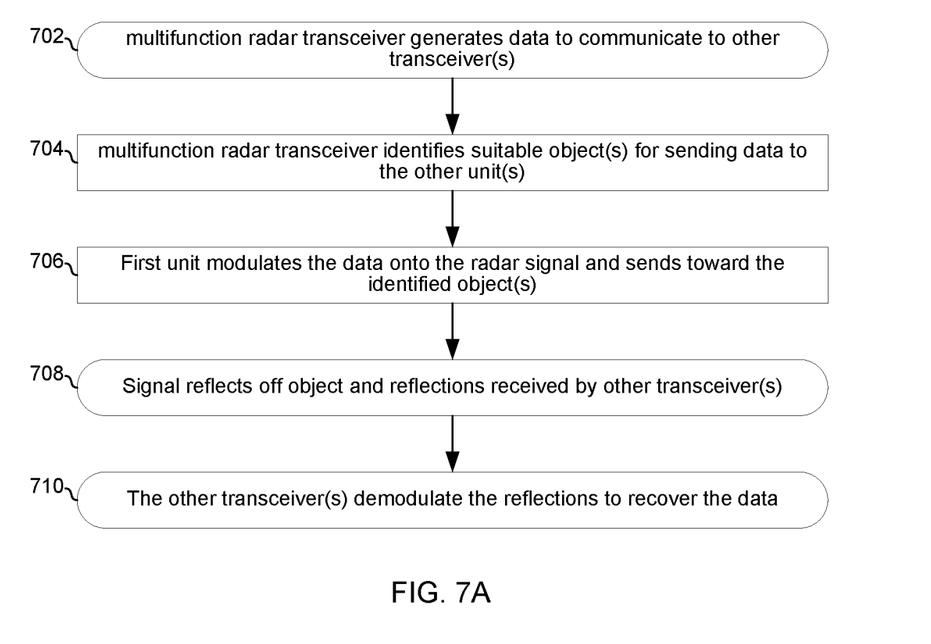
FIG. 7A is a flowchart illustrating an example process for communications among multifunctional radar transceivers.

FIG. 7A is a flowchart illustrating an example process for communications among multifunctional radar transceivers. For purposes of illustration, the process is described with reference to one example scenario of transceiver $102_1$ transmitting to transceivers $102_2$ and $102_3$.

The process begins in block 702 in which radar transceiver $102_1$ generates data to communicate to transceivers $102_2$ and $102_3$.

In block 704, the transceiver $102_1$ analyzes a scene representation generated from recently received signal reflections to identify one or more object(s) off of which millimeter wave signals could be reflected back to transceivers $102_2$ and $102_3$. This determination may be based on a priori knowledge of the relative positions of the transceivers $102_1$, $102_2$, and $102_3$ on the automobile 100.

In block 706, the transceiver $102_1$ modulates the data onto a millimeter wave signal and transmits the signal using beamforming parameters to direct the signal at the object(s) determined in block 704. In an example implementation, characteristics of the signal may be determined based on characteristics of the objects off of which the data is to be communicated and/or based on the amount and/or type of data to be communicated. For example, a relatively high data rate may be used when the signal is to be reflected off of an object that it is close to and/or has a highly-reflective surface (resulting in strong reflections at the destination transceiver), and a relatively low data rate may be used when the when the signal is to be reflected off of an object that is far and/or with a surface that is highly absorptive and/or dispersive (resulting in weak reflections at the destination transceiver).

In block 708, the transmitted signal reflects of the object(s) and is received by transceiver $102_2$ and transceiver $102_3$.

In block 710, the transceivers $102_2$ and $102_3$ demodulate their respectively received reflections to recover the data modulated onto the signal by transceiver $102_1$. The transceivers $102_2$ and $102_3$ may also process the reflections to detect the presence of, identity of, direction of, distance to, and/or speed of objects in the scene.

Figure 7B:
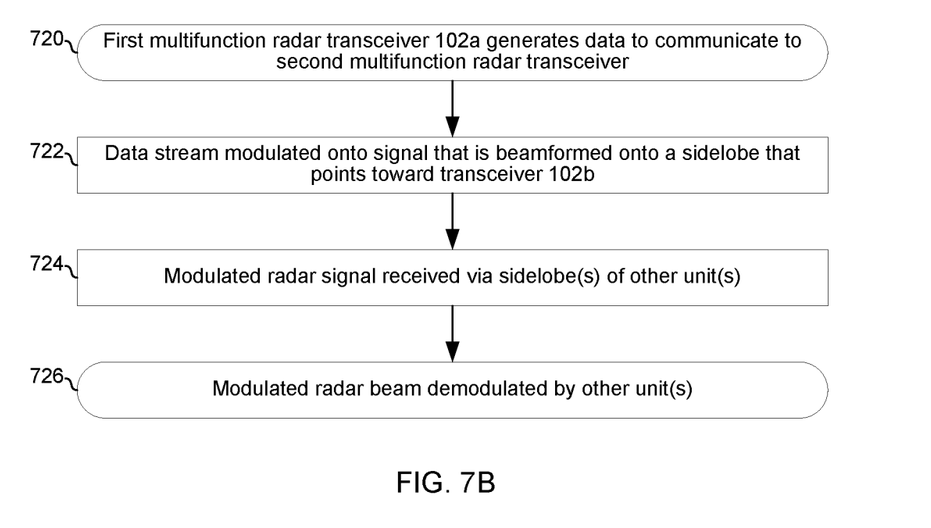
FIG. 7B is a flowchart illustrating an example process for communications among multifunctional radar transceivers.

FIG. 7B is a flowchart illustrating an example process for communications among multifunctional radar transceivers. For purposes of illustration, the process is described with reference to one example scenario of transceiver $102_1$ transmitting to transceiver $102_2$.

The process begins in block 720 in which radar transceiver $102_1$ generates data to communicate to transceiver $102_2$.

In block 722, the data is modulated onto a signal which is then beamformed onto an antenna lobe (e.g., lobe 408 of FIG. 4) that points in the direction of transceiver $102_2$.

In block 724, the transceiver $102_2$ receives the signal from transceiver $102_1$ via its own sidelobe (e.g., lobe 402 of FIG. 4).

The sidelobes may be of little use (and in fact may be undesirable) to the radar function and may therefore be nulled or steered in a different direction when transceiver $102_1$ is not trying to communicate with transceiver $102_2$. The sidelobes may be generated, for example, periodically at predetermined times and/or in response to coordination signals received via data bus 212. The latter case may be such that, for example, transceiver $102_1$ alerts transceiver $102_2$ via data bus 212 that it has data to send but which requires higher bandwidth, lower latency, etc. than can be provided by the data bus 212.

In accordance with an example implementation of this disclosure, an automobile 100 comprises a plurality of transceivers 102. Each of the transceivers is operable to modulate data onto a millimeter wave signal and transmit the millimeter wave signal. Each of the transceivers is operable to receive reflections of one or more of the transmitted millimeter wave signals and process the reflection(s). The processing may comprise determining latency and/or Doppler shift of the reflections relative to the transmitted signals to detect the presence of, identity of, direction of, distance to, and/or speed of objects in the environment surrounding the automobile. The processing may comprise demodulating the reflections to recover the data modulated onto the transmitted signals. The processing may comprise identifying one or more objects in the scene based characteristics of the object(s) and/or the reflections. The processing may comprise determining a precise location of an object detected in the scene and using that precise location along with characteristics of the reflections to determine the precise location of the automobile.

In accordance with an example implementation of this disclosure, a multifunction radar transceiver (e.g., $102_N$) comprises a transmitter (e.g., $204_N$) and a receiver (e.g., $202_N$). The transmitter is operable to modulate data onto a first radar burst, beamform the first radar burst, and transmit the first radar burst via a plurality of antenna elements (e.g., 208 and 210). The receiver is operable to receive a reflection of the first radar burst, perform beamforming of the reflection of the first radar burst, demodulate the first radar burst to recover the data modulated on the first radar burst, and determine characteristics of an object off of which the first radar burst reflected based on characteristics of the reflection of the first radar burst. The characteristics of the object may comprise speed, size, and/or location of the object. The characteristics of the reflection of the first radar signal may comprise its latency (with respect to the time the first radar burst was transmitted, which may be communicated to the receiver via a data bus such as 212), its Doppler shift, and/or its signal strength. The radar burst may comprise one or more OFDM symbols. The data modulated on the radar burst may comprise an identifier of the transmitter. The receiver may be operable to receive a reflection of a second radar burst, and distinguish the first radar burst from the second radar burst based on the first radar burst being scrambled by a first code and the second radar burst being scrambled by a second code. The transmitter may be operable to dynamically select beamforming coefficients to apply to any particular radar burst based on an intended recipient of data modulated onto the particular radar burst such that different radar bursts on which data destined for different recipients are transmitted using different beamforming coefficients. The receiver may be operable to generate a spectral signature of the object, and communicate the spectral signature, a time of capture of the spectral signature, and a location of capture of the spectral signal to a network based service. An antenna pattern with which the first radar burst is transmitted comprises a lobe pointed at the ground (e.g., 408) and the receiver may be operable to determine speed of the multifunction radar receiver relative to the ground using the reflections of the portion of the first radar burst transmitted on the lobe pointed at the ground. The transmitter may be operable to modulate data onto a second radar burst, perform beamforming of the second radar burst, and concurrent with the transmission of the first burst on a first one or more lobes of an antenna pattern (e.g., 404), transmit the second radar burst via the plurality of antenna elements on a second one or more lobes of the antenna pattern (e.g., 406).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A system comprising:
    a multifunction radar transceiver comprising a transmitter and one or more receivers, wherein:
        the transmitter is operable to:
            modulate data onto a first radar burst;
            beamform the first radar burst; and
            transmit the first radar burst via a plurality of antenna elements;
            dynamically select beamforming coefficients to apply to any particular radar burst based on an intended recipient of data modulated onto the particular radar burst; and
        the one or more receivers is operable to:
            receive a reflection of the first radar burst;
            perform beamforming of the reflection of the first radar burst;
            demodulate the first radar burst to recover the data modulated on the first radar burst; and
            determine characteristics of an object off of which the first radar burst reflected based on characteristics of the reflection of the first radar burst.

2. The system of claim 1, wherein the characteristics of the object comprise one or more of: speed, size, and location of the object.

3. The system of claim 1, wherein the characteristics of the reflection of the first radar signal comprise one or more of: its latency, its Doppler shift, its signal strength.

4. The system of claim 1, wherein the radar bursts comprise one or more OFDM symbols.

5. The system of claim 1, wherein the data modulated on the radar bursts comprises an identifier of the transmitter.

6. The system of claim 1, wherein:
    the receiver is operable to receive a reflection of a second radar burst; and
    distinguish the first radar burst from the second radar burst based on the first radar burst being scrambled by a first code and the second radar burst being scrambled by a second code.

7. The system of claim 1, wherein different radar bursts on which data destined for different recipients are transmitted using different beamforming coefficients.

8. The system of claim 1, wherein:
    the receiver is operable to generate a spectral signature of the object; and
    communicate the spectral signature, a time of capture of the spectral signature, and a location of capture of the spectral signal to a network based service.

9. The system of claim 1, wherein:
    an antenna pattern with which the first radar burst is transmitted comprises a lobe pointed at the ground; and
    the receiver is operable to determine speed of the multifunction radar receiver relative to the ground using the reflections of the first radar burst.

10. The system of claim 1, wherein the transmitter is operable to:
    modulate data onto a second radar burst;
    perform beamforming of the second radar burst; and
    concurrent with the transmission of the first burst on a first one or more lobes of an antenna pattern, transmit the second radar burst via the plurality of antenna elements on a second one or more lobes of the antenna pattern.

11. A method comprising:
    modulating, by a transmitter of a multifunction radar transceiver, data onto first and second radar bursts;
    selecting, by the transmitter, beamforming coefficients to apply to the first and second radar bursts based on an intended recipient of data modulated onto the particular radar burst;
    beamforming, by the transmitter, the first and second radar bursts; and
    transmitting, by the transmitter, the first and second radar bursts via a plurality of antenna elements;
    receiving, by a receiver of the multifunction radar transceiver, a reflection of the first radar burst;
    beamforming, by the receiver, the reflection of the first radar burst;
    demodulating, by the receiver, the first radar burst to recover the data modulated on the first radar burst; and
    determining, by the receiver, characteristics of an object off of which the first radar burst reflected based on characteristics of the reflection of the first radar burst.

12. The method of claim 11, wherein the characteristics of the object comprise one or more of: speed, size, and location of the object.

13. The method of claim 11, wherein the characteristics of the reflection of the first radar burst comprise one or more of: its latency, its Doppler shift, its signal strength.

14. The method of claim 11, wherein the radar bursts comprise one or more OFDM symbols.

15. The method of claim 11, wherein the data modulated on the radar bursts comprises an identifier of the transmitter.

16. The method of claim 11, comprising:
    receiving, by the receiver, a reflection of the second radar burst; and distinguishing, by the receiver, the first radar burst from the second radar burst based on the first radar burst being scrambled by a first code and the second radar burst being scrambled by a second code.

17. The method of claim 11, wherein different radar bursts on which data destined for different recipients are transmitted using different beamforming coefficients.

18. The method of claim 11, comprising:
generating, by the receiver, a spectral signature of the object; and
communicating, by the receiver, the spectral signature, a time of capture of the spectral signature, and a location of capture of the spectral signal to a to a network based service.

19. The method of claim 11, wherein an antenna pattern with which the first radar burst is transmitted comprises a lobe pointed at the ground, and the method comprises:
determining, by the receiver, speed of the multifunction radar transceiver relative to the ground using the reflections of the first radar burst.

20. The method of claim 11, comprising performing by the transmitter:
transmitting the second radar burst via the plurality of antenna elements concurrent with transmitting the first radar burst, wherein the first radar burst is transmitted on a first one or more lobes of an antenna pattern and the second radar burst is transmitted on a second one or more lobes of the antenna pattern.

* * * * *